June 24, 1969  G. H. SNYDER  3,451,285
TRANSMISSION CONSTRUCTION

Filed July 25, 1967  Sheet 1 of 4

INVENTOR.
GEORGE H. SNYDER
BY
Dence and Stutz
ATTORNEYS

United States Patent Office 3,451,285
Patented June 24, 1969

3,451,285
TRANSMISSION CONSTRUCTION
George H. Snyder, 534 Ogden Ave.,
Toledo, Ohio  43609
Filed July 25, 1967, Ser. No. 655,872
Int. Cl. F16h 3/08
U.S. Cl. 74—364                              21 Claims

ABSTRACT OF THE DISCLOSURE

A transmission for transferring the rotation of an input shaft induced by a prime mover to an output shaft connected to the item to be driven; the transmission including a pair of gears on the input shaft, one fixed and one freely rotatable; a countershaft assembly inclusive of a countershaft and end mounted gears, one of which is controlled by a clutch for transferring the rotation of the input shaft to the free-wheeling gear and a modified clutch arrangement carried by the rotatable gear, providing individually clutch actuated gear trains, one of which extends through the countershaft assembly and the other of which operates directly from the input shaft to the output shaft.

---

The present invention relates to a transmission construction of unusual design and improved capabilities.

The present invention will be described in connection with a passenger vehicle. It will be appreciated, however, that the transmission construction of the present invention will have wider application as, for example, with trucks, heavy duty off-the-road equipment and, as well, a variety of heavy duty machinery requiring transmission of variable rotation as produced by a prime mover to a machine having variable speed load.

It is an object of the present invention to provide an improved transmission construction.

It is a particular object of the present invention to provide an improved transmission construction which obviates the necessity for alternate engagement and disengagement of different gear trains.

It is also an object of the present invention to provide a transmission which is controlled by fluid pressure in the changing from one gear ratio to another as between the input shaft and the output shaft.

It is still another object of the present invention to provide a transmission which is automatic in correlating the setting of the appropriate gear ratio to the speed of the vehicle.

It is still another object of the present invention to provide a transmission construction which is relatively flat in its vertical dimension, thereby substantially reducing the hump in the floorboard of the conventional automobile.

It is still another object of the present invention to provide a transmission which is capable of manual shifting as well as automatic shifting, dependent upon the speed of the vehicle.

It is still another object of the present invention to provide an arrangement for disengaging the transmission under emergency stop conditions.

The foregoing, as well as other objects of the present invention, will become apparent to those skilled in the art from the following detailed description taken in conjunction with the annexed sheets of drawings on which there are presented, for purposes of illustration only, several basic embodiments of the present invention.

The transmission of the present invention envisions a multiple clutch transmission; the various gear trains being constantly enmeshed and featuring unique arrangements for switching the input/output gear ratio from one gear train to the other. In particular, the present invention envisions a primary drive gear operative through a plurality of countershaft assemblies to a free-wheeling gear mounted on the input shaft but embodying an internal clutch arrangement permitting direct drive as well as a positive connection means for the free-wheeling gear to the output shaft, whereby rotation of the free-wheeling gear is translated to the output shaft irrespective of the direction of rotation of the free-wheeling gear or the rotional velocity of the free-wheeling gear.

Figures 1, 2, 3:
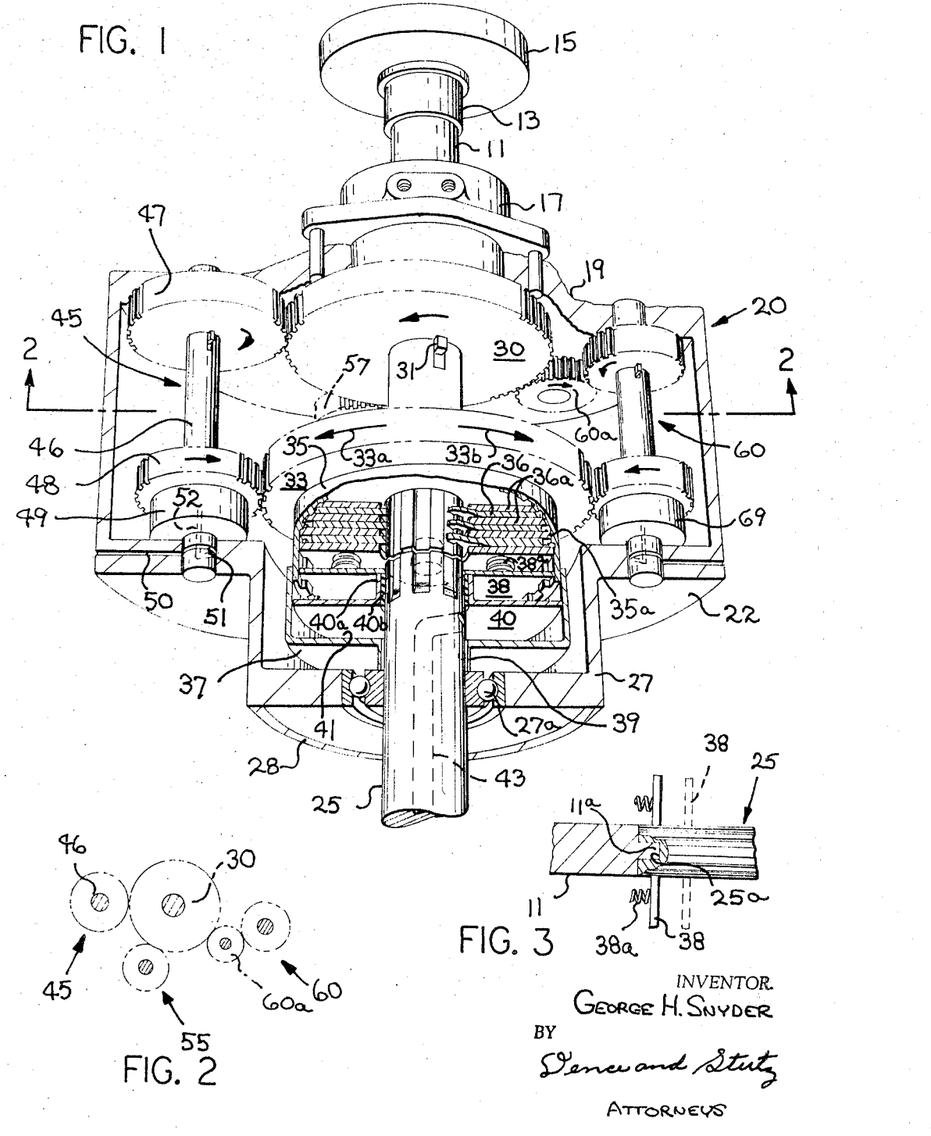
FIG. 1 is a schematic perspective view of a complete transmission in accordance with the present invention but with the casing and, as well, certain components broken away to show the interior construction as an operative interrelationship of moving parts.
FIG. 2 is a partial vertical section view taken on the line 2—2 of FIG. 1.
FIG. 3 is a partial sectional view showing the relationship of the input shaft and the output shaft.

Referring now more specifically to the drawings, and particularly FIGS. 1-3, the reference numeral 11 identifies the input shaft proceeding from collar bearing 13, fly wheel 15 and engine (not shown). The input shaft extends rearwardly through a pump 17 and the fore wall 19 of a transmission casing 20. The input shaft terminates within the casing approximately in line with the offset rear wall 22 of the transmission casing. A pilot hub 11a integral with the input shaft is embraced by recess 25a in the fore end of output shaft 25. The output shaft 25 is in alignment with the input shaft and extends rearwardly through the aft extension 27 of the casing 20; the extension including a main bearing 27a and a like bearing (not shown) to the rear thereof, but also mounted in the aft housing which is broken away as at 28.

Mounted on the input shaft just aft of the wall 19 is a principal drive gear 30 keyed to the input shaft as at 31 for counterclockwise rotation with the input shaft, as indicated by the arrow. Aft of the principal drive gear 30 is coaxially mounted, in free-wheeling relationship thereon, a transfer gear 33. Bell housing 35 mounted on the free-wheeling gear 33 extends coaxially rearwardly and is embraced by a second bell housing 37. The latter includes a bronze bearing flange 39 of annular configuration which rotatingly embraces the output shaft in fluid sealed relationship just forward of the bearing 27a. The bell housings 35 and 37 define a chamber aft of the free-wheeling gear 33.

At the rear end of the input shaft 11 (within housing 35), three radially extending disks 36 are splined connected to the input shaft as shown. A similar series of disks 36a are splined connected to the inner periphery of the bell housing 35, as at 35a. An annular follower disk 38 is splined connected at its outer periphery to the bell housing 35 and its inner periphery is splined connected to the output shaft 25.

Aft of the follower disk 38, an annular piston 40, including annular flange 40a, rotatably and slidably embraces the output shaft as at 40b, providing relative rotation as between the output shaft and the annular piston 40. Proceeding aft, the annular piston plate 40 and the aft bell housing 37 define an annular fluid sealed chamber 41 fluidly connecting with axial conduit 43 (dotted line) formed in the output shaft 25.

Countershaft assemblies 45, 55 and 60 are clustered in spaced relationship from the input shaft 11 (see FIG. 2). The countershaft assemblies 45, 55 and 60 are generally identical excepting for (1) the diameter of the gear components, (2) the number of teeth therein, which in combination define different gear ratios, and, particularly in the countershaft assembly 60, (3) the presence of idler gear 60a, which translates the rotation of the principal drive gear 30 into a reverse gear arrangement. In view of the foregoing, the countershaft assemblies 55 and 60 will not be further discussed in detail in favor of a description of the countershaft assembly 45, including the operation thereof.

The countershaft assembly 45 is composed of a principal countershaft 46 rotatably mounted in spaced, parallel relationship with the input shaft 11. A first gear 47 is keyed at one end of the countershaft 46; the gear 47 in enmeshing relationship with gear 30. At the opposite end of countershaft 46, a second gear 48 is free-wheelingly carried by the countershaft assembly in coaxial relationship. A clutch 49 carried by the gear 48 provides selective connection of the gear 48 to the countershaft 46. The free-wheeling gear 48 is constantly enmeshed with the gear 33. The clutch 49 is fluid actuated as provided by fluid pressure impressed thereon through conduit 50 in the casing leading to the groove 51 in the bearing and the conduit 52 located coaxially within countershaft 46 leading to the clutch 49.

By reason of the angle of perspective in which FIG. 1 is presented, countershaft assembly 55 is discernible only by the presence in dotted outline of the gear 57. Taking FIG. 1 in combination with FIG 2, it is readily apparent that the countershaft assembly 55 provides a gear train connection between the drive gear 30 and transfer gear 33 in the same manner as countershaft assemblies 45 and 60.

It may be here stated that countershaft assembly 45 defines a gear train constituting first gear (low ratio) while countershaft assembly 55 constitutes second gear (intermediate ratio) and countershaft assembly 60 including idler gear 60a defines a reverse gear train. Third gear [or direct drive as between the input shaft 11 and the output shaft 25] is provided by the multiple disk arrangement within the bell housing 35.

In operation, the transmission translates the rotation of the input shaft 11 to the output shaft 25 in the following manner. Assuming that clutch 49 of countershaft assembly 45 (low gear) is actuated by transmission of pump line pressure through the conduit arrangement 50, 51 and 52 to the clutch 49, then it will be appreciated that the rotation of the input shaft will be translated to free-wheeling gear 33 via the gear train: gear 30, gear 47, countershaft 46, gear 48 and free-wheeling gear 33. The gears 30, 47, 48 and 33 are exterior gears and are constantly enmeshed. In view of the gear train as just described, the rotation of the gear 33 will be in a counterclockwise direction as indicated by the arrow 33a. This rotation will be carried by the connected bell housing 35 to the annular follower disk 38 which is spline connected thereto and also to the output shaft 25. The rotation of output shaft 25, of course, is translated therebeyond into rotation of the rear wheels in conventional fashion. The rotation referred to is as viewed from the rear as seen in FIG. 1.

Second gear drive connection as represented by the countershaft assembly 55 is provided by actuation of the clutch controlling it, resulting again in a counterclockwise rotaton of the transfer gear 33 which is translated to the output shaft via the splined follower disk 38 within the bell housing 35. It will, of course, be understood that with the clutch controlling the second countershaft assembly 55 actuated, clutch 49 of countershaft assembly 45 is not actuated whereby gear 48 is not connected to the countershaft 46 but is free-wheeling thereon. Reverse countershaft assembly 60 when actuated by actuation of clutch 69 causes the transfer gear 33 to rotate in a clockwise direction as indicated by the arrow 33b by reason of the idler gear 60a. The rotation of transfer gear 33 is translated to output shaft 25 via the rotation of integral bell housing 35 and annular follower disk 38 which is splined to the bell housing 35 as at 35a and to the output shaft.

The speed of angular rotation of the output shaft, of course, will be determined by the character, size, number of teeth, etc., of the components in the various gear trains constituting the countershaft assemblies 45, 55 and 60.

A third gear, e.g., a direct 1 to 1 ratio drive as between the input gear and the output gear, is achieved by actuation of the multiple disk clutch within the bell housing 35. This occurs when, by appropriate control, as described hereinafter, line fluid pressure is indiced in the chamber 41 communicated thereto via conduit 43 in the output shaft. The increase in pressure will be exerted on the piston plate 40 which will result in it moving slightly forward in the direction of the input shaft. The piston plate includes an integral flange 40a secured to a bronze bushing 40b which rotatably and slidably encircles the output shaft. The forward motion of the piston 40 through the flange is transferred to the follower disk 38 causing it in turn to move forward, compressing the springs 38a, of which there are a plurality mounted radially about the juncture of the output and input shafts. The springs transfer the forward movement of the disk 38 evenly to the first of the array of disks 36 and 36a constituting the clutch for third gear. Actuation of the latter as described secures the input shaft to the bell housing 35, causing it to rotate with the input shaft. As in the previous arrangements, the rotation of the bell housing 35 is transferred to the output shaft via the disk 38 which is spline connected to the output shaft and to the bell housing. The disk 38 is shown in forward and aft positions 38 in solid and dotted lines respectively in FIG. 3.

It should go without saying that only one clutch of the several clutches involved are actuated at a given time. Thus, with the clutches in the other countershaft assemblies not actuated, the gears there are simply spinning free; that is, the countershaft assemblies are not under load when the third gear arrangement, e.g., the multiple disk clutch assembly within the bell housing, is actuated at just previously described.

Figures 4, 5:
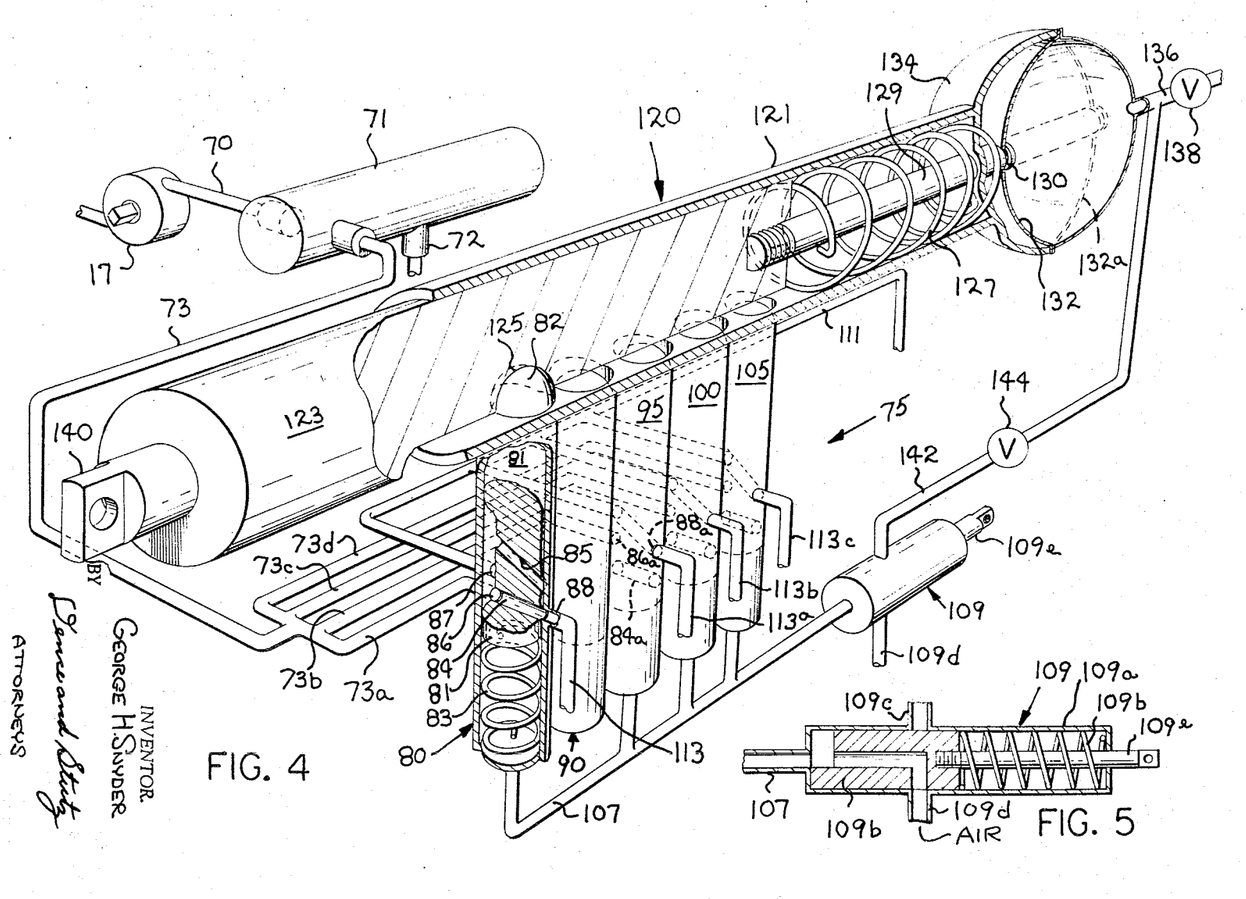
FIG. 4 is a schematic perspective view partially broken away for purposes of showing the interior construction of a fluid valving system for controlling the transmission of FIGS. 1 and 2.
FIG. 5 is an enlarged sectional view of one vacuum valving component of the apparatus system shown in FIG. 4.

Reference may now be had to FIG. 4 wherein there is disclosed a control system for effecting individual actuation of the individual clutches. Reference numeral 17 identifies the pump; the impeller of which, although not being shown, is located interiorly and is turned by the input shaft 11. This pump is shown mounted just forward of the transmission housing 20 in FIG. 1. In any event, the outlet side of the pump is connected to a surge tank 71 having a surplus pressure release outlet 72 and a conduit 73 leading to the valving arrangement, generally identified by the reference numeral 75.

The pressure surge ank 71 is simply a fluid sealed cylinder having a spring opposed piston therein providing a chamber of variable volume. If the pressure exceeds a certain value, the interior piston is urged against a spring a sufficient distance to uncover a pressure relief outlet 72. This will, as indicated, provide a relatively constant pressure in the conduit 73 leading to the inlet ports of the multi-tube valving arrangement 75 and consequently to the various fluid actuated clutches.

The valving system consists of five side-by-side hollow tubes 80, 90, 95, 100 and 105, each representing a station involving a different gear ratio activation. Tube stations 80, 90, 95 and 100 are identical and therefore only tube 80 will be discussed in detail and for that reason it is shown with parts broken away in order to show the interior. The hollow tube 80 contains an essentially solid vertically movable plug 81 having an upper rounded nose 82; the base of the plug resting on a spring 83. The plug contains two vertically spaced transverse bores 84 and 85. The tube 80 has side ports 86 and 87, one above the other, and port 88 opposite port 86. Port 86 connects with conduit 73a; one of the four branches 73a, 73b, 73c and 73d which has been formed from outlet conduit 73. The other branches extend and connect with ports in the stations 95, 100 and 105. Port 87 connects with relief conduit 111, while port 88 connects with conduit 113. Ports 86 and 88 are connected by bore 84 when the plug 81 is in its "up" position, thereby connecting conduit 73 with conduit 113. Ports 87 and 88 are connected by bore 85 when the plug 81 is in its "down" position, thereby connecting conduit 113 with pressure relief line 111 leading to an oil pan or other suitable reservoir. Similar connection of pump line pressure in line 73 with conduit 113a of station 95, conduit 113b of station 100 and conduit 113c of station 105 and connection of the series 113 conduits with pressure relief line 111 is achieved by location of the plugs of these stations in the appropriate "up" or "down" position. A valve selector 120 situated just above the valving system 75 is composed of an outer casing 121 in which core 123 slides axially. Core 123 has a recess 125 formed on its underside which is adapted to receive the nose 82 of plug 81 as shown. Movement of core 123 to the right is opposed by a spring 127 encircling a shaft 129 which is threadingly connected to the core 123. The opposite end of the shaft 129 is sealingly connected as at 130 to a diaphragm 132 located in a housing 134. As shown broken away, the housing 134 is fluidly connected to a line 136 which extends beyond valve 138 to the intake manifold vacuum. The opposite end of the core 123 identified by the reference numeral 140 is adapted for connection by appropriate levers to a gear shift mounted lever arm (not shown) but adapted for manual movement of the core 123 as to locate the recess over any one of the tubes 80, 90, 95, 100 or 105, causing the plug therein corresponding to the plug 81 in tube 80 to move upwardly into the recess. It will be appreciated that when the recess is positioned over any one of the five stations, the other plugs in the tube will be in the "down" position. Lower conduit 107 connects the base chamber, containing the spring 83, of all of the stations, except the tube station 90, with 109 composed of a housing 109a and a valve plug 109b. The valve 109 connects via opening 109c with vacuum line 142 which extends beyond valve 144 to the conduit 136 which is likewise connected to the source of vacuum. Valve opening 109d is open to the air with the valve positioned as shown in FIG. 5. Horizontal movement of the plug 109b is accomplished via lever arm 109e opposed by spring 109f. Movement of the plug body 109b to the right as actuated by the lever 109e will connect opening 109c with conduit 107, whereas in the leftmost position, as shown, the conduit 107 is connected to air opening 109d. When the conduit 107 is connected to vacuum, the vacuum impressed on any one of the tubes 80, 95, 100 or 105 will cause the plug 81 to stay in or move to its "down" position regardless of the position of the recess thereabove.

The operation of the selector apparatus of FIG. 4 is as follows. With the selector arm 123 located so that recess 125 receives nose 82 of the plug 81 of station 80, the line oil pressure as generated by the pump 17 in conduit 70 (and as controlled to a particular pressure by pressure relief tank (71) is transferred via conduit 73, through branch conduit 73a, port 86, bore 84, port 88 and conduit 113 which extends to the reverse clutch 69 (FIG. 1). This actuation of clutch 69 engages countershaft assembly 60 (including the shaft and gears therein) whereby the output shaft 25 rotates in a direction counter to the input shaft by reason of the idler gear 60a and at an angular rotation determined by the gear train of the assembly. Manual movement of selector arm core 123 via a linkage connected to end 140 so that the recess 125 moves above tube 90 will cause the rounded end of the plug 81 at station 80 to move downwardly, connecting conduit 113 with port 88 via transfer bore 85 and thereby to conduit 111. Any pressure in line 113 leading to reverse clutch will thus be relieved back to the relief line 111 to the oil pan. The selector arm core recess 125, for example, situated over the tube station 90, will similarly connect conduits 113 or 113a or 113b or 113c to the exit line 111, allowing fluid pressure in all lines leading to clutches to be relieved.

Further movement of the selector arm actuator core 123 to the right, manually, through the linkage connected at 140 against the pressure of spring 127 will effect movement of the recess 125 over the plug in the tube station 95. This will cause the tube therein to move to an "up" position connecting conduit 73b with conduit 113a since the bore 84a (shown in dotted outline) will be connecting the opposed ports 86a and 88a. The constant line pressure will thus be impressed through conduits 113a, 50, 51 and 52 to the clutch 49 which controls countershaft assembly 45 which defines a first (low ratio) gear train. The output shaft will thus rotate the wheels of the vehicle in first gear. Further manual movement of the core 123 to the right will locate the recess 125 over tube station 100, moving the plug of station 100 up so that bore 84 connects line pressure in line 73 to conduit 113b which connects with the fluid actuated clutch controlling countershaft assembly 55 (second gear) causing it to be actuated. Finally, movement of selector arm core 123 further to the right with recess 125 situated above tube valve 105 causes the plug therein to move to the "up" position together with the bore therein, causing the line pressure of 73 to be exerted through conduit 113c via conduct 73d, whereupon the line pressure will be conveyed through to conduit 43 in output shaft 25 actuating the multiple disk clutch arrangement in the bell housing 35 (such constituting third gear or a 1 to 1 input to output shaft relative rotation).

At the same time, as described earlier, all the other clutches will be deactuated and, in fact, the fluid pressure in these conduits bled back through the tube stations to the conduit 111 leading to the oil pan.

Now in accordance with a preferred embodiment of this invention, the above sequence of movement of the selector arm can and is effected automatically by reason of the vacuum arrangement at the end of the selector arm 120. As already described, a vacuum line 136 extends to the intake manifold. Valve 138 provides manually controlled or automatically regulated valve control of the vacuum within the housing 134. Assuming that the vehicle is in first gear, that is, with the recess 125 formed in the core 123 situated over the tube 95, the first gear clutch controlled countershaft assembly 45 would be actuated by fluid pressure valving as described. The vehicle would commence in the appropriate low gear. As it picked up velocity, the vacuum generated by the intake manifold would be impressed on the diaphragm 132, urging it toward the position shown in dotted outline identified by the reference numeral 132a. This would cause movement of the plug to the "down" position and deactivation of station 95 controlling first gear countershaft assembly 45. The selector would move to a position with the recess 125 situated over the second gear control valve 100, causing the plug therein to go up as urge by the lower spring actuating countershaft assembly 55 by appropriate fluid pressure as described. Continued buildup in vacuum impressed on the diaphragm 132 caused by increased velocity will move the selector arm 123 to the right, situating the recess 125 over the tube valve 105 connecting the line pressure through conduit 113c to conduit 43 actuating third gear and simultaneously all other clutches are deactuated since the conduits are relieved to relief line 111.

The vacuum in the housing 134 can be controlled by the valve 138, as indicated, and this control plus the selection and design of the spring can be balanced to provide an automatic shifting from first gear through third gear, or more gears in certain cases.

At the same time, a vehicle proceeding in third gear, when slowing down, will cause a simultaneous decrease in the vacuum in the intake manifold, causing the diaphragm to move to the left toward the full line position 132 as urged by the spring 127, whereupon the recess would move, as the speed decreased, over tube 100 causing an automatic shifting of the vehicle into second gear and finally into first gear.

The vacuum/spring balance is so controlled or stops are employed so that the slow down in velocity and consequent decrease in vacuum would not cause the control arm 123 to move automatically more rearwardly than over station 95. Movement of the selector arm to neutral or reverse must be manually performed.

It will be noted that tube 90 has no conduits connected thereto since it is in neutral position and all clutch lines are relieved to relief line 111. The vehicle operator can, by control of his gear shift lever (not shown), move the selector core 123 via any appropriate set of linkages connected to the end 140, thus permitting the automobile to be shifted into reverse; namely, with the recess 125 situated over tube 80.

A parking position has not been shown but it will be readily understood that a "park" position for the gear shift, steering-column-mounted lever may be arranged for in conventional fashion; namely, providing a suitable stop engagement of the output shaft proximate the bearing 27a, preventing rotation of the output shaft.

The valve arrangement 109, shown enlarged in FIG. 5, represents a refined embodiment of the present invention, if used, and envisions a separate laterally moving foot pedal just to the right of the accelerator. This is not shown since it is readily visualized. The laterally moving foot pedal when actuated by the operator (in the vehicle proceeding along the highway) moves the lever arm 109 (perhaps hydraulically assisted) to the right connecting conduit 107 with the opening 109c which connects through valve 144 with conduit line 136. Impressment of the vacuum in the chamber constituting the lower portion of the tubes would immediately pull all the plugs down against the springs 83. With all the plugs in the valving station 25 in the "down" position, no fluid actuating pressure reaches any of the clutches and the vehicle is, in effect, in neutral. This would have the result that the operator could brake the vehicle to a stop in less time than would be possible with the vehicle in third gear, considering the inertia phenomena attendant the vehicle remaining in gear under braking situation. It, of course, is recognized that manual movement of the gear lever to a lower gear situation, such as second or first, would immediately actuate the clutch controlling a lower gear ratio which could have a braking of the vehicle. However, the unskilled driver would not attempt to move the lever into a lower clutch position but would rely simply on the brake. The inertia accordingly would not allow braking to a stop as rapidly as if the vehicle were in neutral, as achieved by actuation of the separate pedal (not illustrated), throwing the vehicle into neutral by the impression of the vacuum on the tube stations. Of course, the removement of the foot from the laterally movable pedal would immediately remove the vacuum impression on the lower region of the tubes of valving station 75. Thus, plug 109b moves to the position shown in FIG. 5, closing vacuum opening 109c and connecting air opening 109d to line 107 and consequently to lower region of all tubes of station 75. As a consequence, springs 83 in these stations will urge the particular plug situated in registry with recess 125 upwardly. Registration or, in other words, the location of the selector arm will depend either upon the velocity of the vehicle (translated into vacuum urgement of core 123 against spring 127) or upon the manipulation of the core 123 by the operator. Naturally, the particular station of which the plug 81 is in the "up" position will then control the actuation of the corresponding clutch, thereby determining the selection of the appropriate gear train ratio as to input/output relationship.

The fluid valving system for effecting shifting of the transmission to various gear ratios as illustrated in FIG. 4 has been presented as an arrangement of components and conduits as most easily permit a visual perception of the valving. It is to be appreciated that the tubing 73, 70, 73d, 73c, 111, 113, etc., would be formed in the walls and compartments of a cast housing containing the tube stations, the reservoir tank, etc. Thus, it is envisioned that the apparatus of FIG. 4 in commercial application would be located in a cast housing situated right next to the transmission with passageways formed in the casing components connecting with like passageways in the abutting transmission casing 20; all providing a convenient fluid communication between the pump and the individual clutches in the sequence as provided by either manual manipulation of the core selector 123 or as provided by the vacuum control arrangement.

Figure 6:
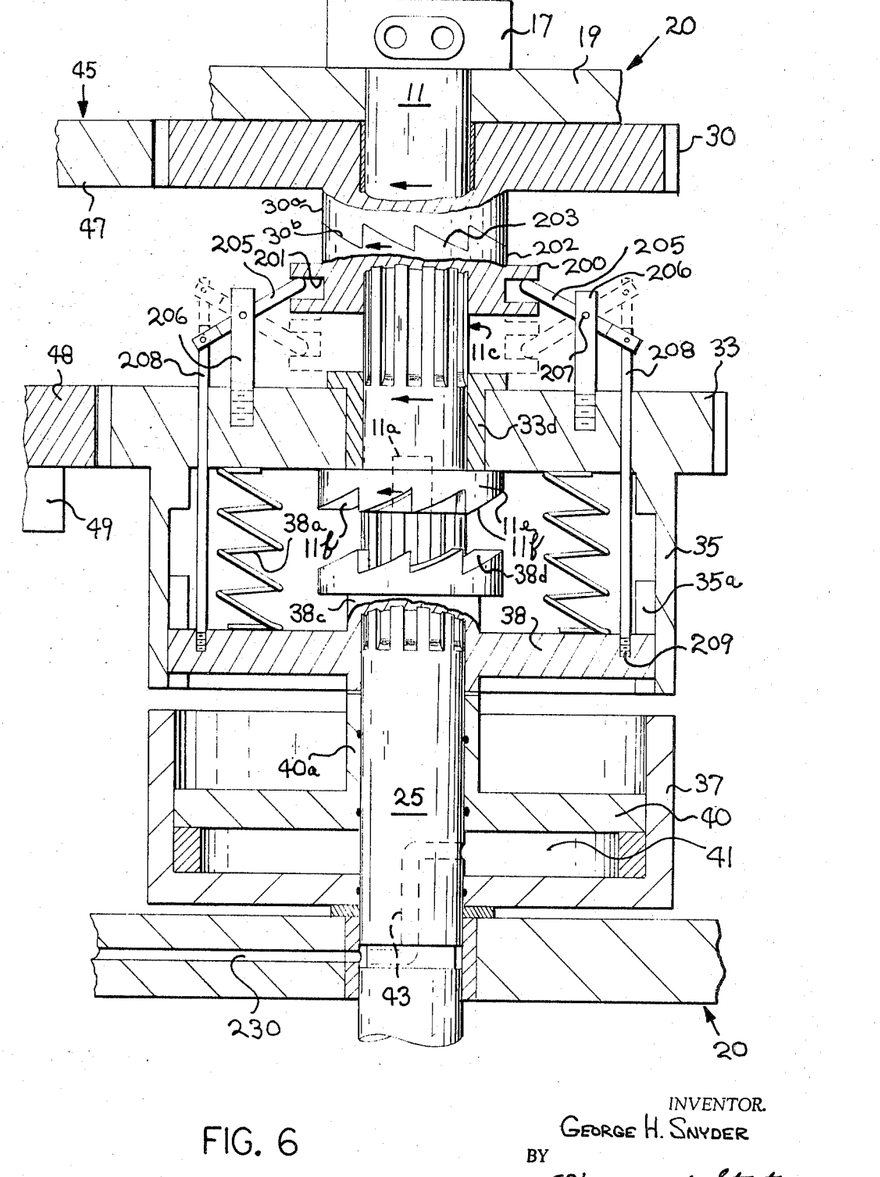
FIG. 6 is a horizontal sectional view of a portion of a transmission as viewed in FIG. 1, but embodying a variant clutching construction in accordance with another embodiment of the present invention.

A slightly modified transmission construction is illustrated in FIG. 6. In presenting this embodiment, which involves principally a slight modification in the components immediately surrounding the input and output shafts, the countershaft assemblies have been largely left out in the interest of eliminating components already illustrated and discussed.

In describing the construction of FIG. 6, the transmission components which are common to the embodiment of FIG. 1 will bear the same reference numerals. In this embodiment, the input shaft extends rearwardly through the pump 17 and the fore wall 19 of the transmission housing 20. Just inside the casing, gear 30 is free-wheelingly mounted on the input shaft 11 rather than being keyed to the shaft 11. The gear 30 includes an aft hub 30a integral therewith, having on its aft annular edge positive engagement clutch teeth 30b formed thereon. The input shaft 11 has splines formed thereon as at 11c. Splined to the shaft is a collar 200 having a peripheral groove 201 formed thereon and a forward hub 202 integral therewith having forwardly formed positive engagement clutch teeth 203 adapted to engage the clutch teeth 30b of gear 30 for counterclockwise rotation, as shown. The collar is controlled to move axially upon the shaft 11 between the position shown in solid outline with the gear teeth 202 and 203 just discussed in positive engagement and an aft position shown in dotted outline as controlled by a plurality of pivotably movable lever arms 205 pinned on studs 206 as at 207. The arms ride freely in the continuous peripheral groove 201. The opposite ends of the arms 205 are pivotably connected to actuation rods 208 which extend through gear 33 and are anchored as at 209 in follower disk 38. Springs 38a between follower disk 38 and gear 33 urge the pivotal lever arms 205 and the collar 200 in the position shown in full line, wherein the positive engagement clutch gears 202 and 30a are in engagement. The studs 206 to which the actuating arm 205 is pivotably connected is anchored in gear 33.

Gear 33 is freely rotatably mounted in coaxial relationship about input shaft 11 via bearing 33d. Input shaft 11 has a hub 11e formed at its aft end having positive engagement clutch teeth 11f formed thereon. Disk 38 has a forwardly extending hub 38c formed thereon and positive engagement clutch teeth 38d meshable with the clutch teeth 11f on the input shaft. The annular disk plate 38 and its hub portion 38c are splined to the output shaft as shown and, as well, to the inner periphery of housing 35; the splines in the latter being identified by the reference numeral 35a. As in the previous embodiment of FIG. 1, the disk 38 is axially movable on the spline portion of the output shaft responsive to urgement of flange 40a formed on the piston 40. The piston 40 in turn moves axially on the input shaft responsive to the fluid pressure in the chamber 41 impressed thereon directed thereto through condiut 43 which proceeds as shown through a passageway 230 in the end wall of the transmission housing 20. This conduit connects with conduit 113c (FIG. 4) proceeding from the tube station 105 constituting third gear.

In the arrangement as shown in FIG. 6, the clutch members 11e and 38d inside the housing 35 are disengaged due to urgment of springs 38a moving disk 38 rearwardly, while simultaneously the lever arrangement 208–205–206 is urging collar 200 forwardly, engaging clutch gear elements 30a and 202. The collar 200, being spline connected to the input shaft, turns the hub and connected gear 30 in a counterclockwise direction. The pivot arms 205 simply ride in the continous peripheral slot 201 as the collar rotates. The rotation of gear 30, which becomes a drive gear when clutch engaged, is conveyed through any one of the countershaft assemblies (45, 55 or 60) which may be actuated by reason of the location of the selector arm arrangement 120 of FIG. 4, causing actuating of the appropriate countershaft clutch.

Assuming that the countershaft assembly 45 partially illustrated in FIG. 6 were actuated (as would be the situation if the recess 125 of core 123 were located over the tube station 95 directing the pressure within the surge tank 71 through the appropriate conduits, as discussed, to conduit 113a leading to clutch 49), then the rotation of the output shaft would be controlled through countershaft assembly 45 or, in other words, in a low gear ratio, e.g., first gear as described in connection with the embodiment of FIG. 1.

Continued acceleration of the vehicle would effect a sequential movement of the selector arm (due to vacuum increase in housing 134), advancing the recess sequentially gradually to tube station 100 which is the second gear and then to station 105 which is third gear. In the latter situation, line pressure would be impressed through conduit 113c (FIG. 4) to conduit 230 (FIG. 6), conduit 43 leading to chamber 41. [Simultaneously, pressure in all of the other fluid actuated clutches in countershaft assemblies 45, 55 and 60 would be relieved through bores 85 (and relief line 111) in each of the plugs of tube stations 80, 95 and 100, deactivating the associated gear trains.] The pressure increase in chamber 41 urges piston 40 forwardly, moving disk follower 38 forwardly, albeit still splined as at 35a to the bell housing 35. Forward movement of disk 38 causes engagement of the positive engagement gear clutch arrangement 38d–11f; the latter being integrally part of input shaft 11. At the same time, the lever arrangement, due to forward movement of disk 38, pivots the collar 200 rearwardly, disengaging the clutch gear 202 from clutch gear 30b and also causing gear 30 to become disengaged, thereby resuming its free-wheeling relationship with shaft 11. Rotation of output shaft 25 under this drive is a 1 to 1 ratio of input to output shafts. Disk 38, housing 35 and gear 33 rotate along with the input and output shafts. The gears, such as gear 48 connecting with gear 33, would also rotate but they in turn being freely rotatable since not clutch actuated into engagement with their respective countershafts. The countershafts themselves and forward gears, such as 47 as well as forward gear 30, would not be rotating excepting due to any inertia due to the bearing friction or drag.

The principal feature of the embodiment of FIG. 6 resides in the positive engagement clutch and the provision for translating the engagement of disengagement of the clutch arrangement 38d–11f to simultaneous alternate disengagement or engagement of positive engagement clutch gear arrangement 202–30b just aft of the gear 30.

Figure 7:
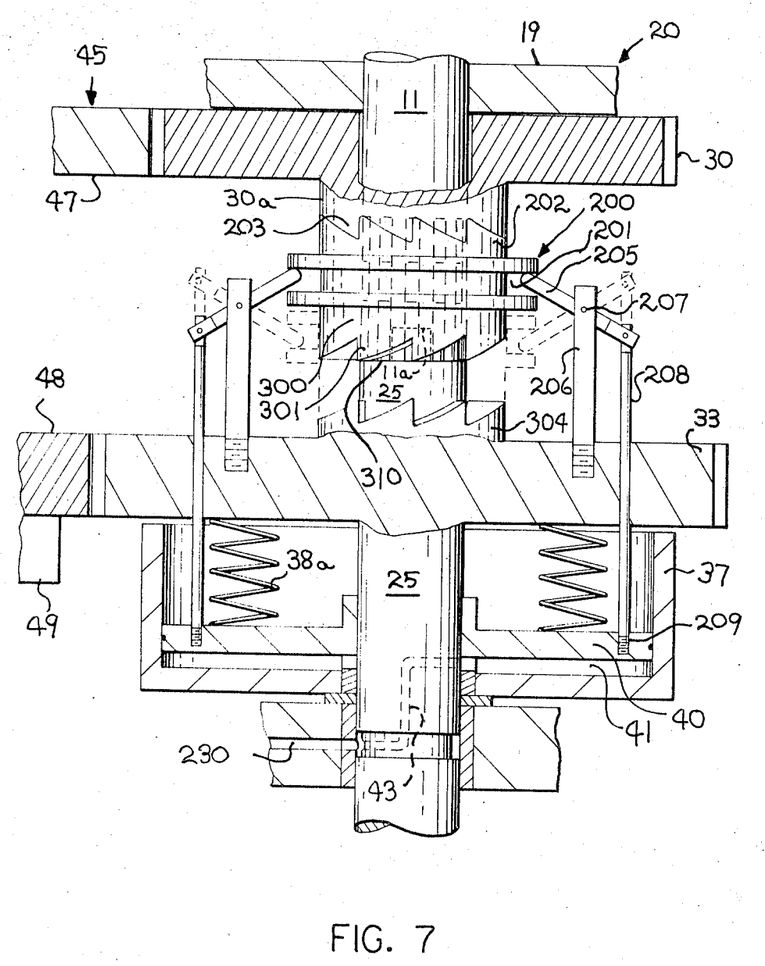
FIG. 7 illustrates a variant clutch arrangement for the principal input shaft gear and output shaft gear.

Reference may now be had to FIG. 7 wherein there is disclosed as a further embodiment, an improvement in the shiftable arrangement for effecting alternate engagement and disengagement of the several gear clutches as described in connection with FIG. 6. In view of the detailed description of the construction and the operation of the transmission appearing hereinbefore in describing the previous figures, it is believed that only a brief description of the differences involved in the construction according to FIG. 7 as compared to that in FIG. 6 will be necessary to convey an understanding of the operation. The parts that are in common with the embodiments of FIG. 1 and FIG. 6 will bear the same reference numerals for ease in correlating the description with the drawings.

In the embodiment of FIG. 7, housing 35, disk 38 (including hub 38d and gear clutching arrangment 38d) and the hub 11e (including gear clutch 11f) are eliminated.

Further in this embodiment, the collar number 200, in addition to having a forward facing gear clutch 202 formed thereon, has an aft facing gear clutch 300 having teeth 301 formed thereon. Additionally, the output shaft 25 and the rear transfer gear 33 are integral or secured together so that they rotate as one. Also, a forward facing gear clutch 304 is formed on the transfer gear 33 integral therewith and is adapted for meshing engagement with the teeth 301 of the aft facing gear clutch 300 formed on collar 200. The collar 200 reciprocates and is shown in its forward position in solid line in engagement with the gear cluch 203 formed on the first transfer gear 30. The collar moves to the rear upon actuating of the arm 208 and pivot arm 205 about pin 207. With the pivoting action, the arm 205 which simply rides in the peripheral groove 201 moves the collar to the rear and into engagement with the gear clutch 304 formed on the aft transfer gear 33. The collar 200 is splined to the input shaft as indicated in dotted outline so that it rotates therewith.

The actuation of the pivoting arrangement 208 and 205 occurs when liquid pressure [produced by pump 17 (FIG. 4)] is impressed through conduits 230 and 43 to the chamber 41 which causes the piston 40 to move axially forward against the springs 38a causing arms anchored therein as at 209 to likewise move forward effecting the pivoting action. This particular movement of piston 40 occurs, of course, only when the selector arm 123 is in the third gear position, that is, with the selector arm recess 125 over tube 105 connecting the pump pressure line 73 through the transverse bore connecting with conduit 113c (FIG. 4) and alternately conduit 230 of FIG. 7. With the selector arm in any other position, the pressure is relieved backwards through conduits 111 as discussed previously whereupon the collar 200, due to the pivoting action described, moves forward into engagement with the gear clutch 203 thereby securing gear 30 to the input shaft 11 since collar 200 is splined to the input shaft.

The selector arm recess 125 will then be actuated over one of the other tube stations whereupon the pump line pressure in line 73 will be impressed through the appropriate conduit to actuate one of the other clutches of the countershaft assemblies 45, 55, or 60 (FIG. 2). Assuming for example that clutch 49 of the countershaft assembly 45 was actuated then gear 48 would be engaged with its countershaft 46 (FIG. 1). With this arrangement, the gear train would be for the input shaft through the gear 30, the gear 47, countershaft 46 (not shown in this FIG. 7) to gear 48 and to gear 33, which, as indicated, is integral with output shaft 25. It may be noted that the fore end of output shaft is forward of the gear 33 and can be located by reference to reference numeral 11a which is the pilot recess. Numeral 310 identifies the line separating the input shaft 11 from the output shaft 25.

As previously described, the actuation of the countershaft assembly 45 would constitute first gear and automatic shifting through second and third would occur as the velocity increased in the same manner as described earlier herein. When third gear was reached, namely, tube station 105, all of the countershaft clutches would become disengaged and the gears about gear 33 would be simply free-wheeling, whereby the direct connection of the input and output shaft through the gear arrangement 300 and 304, turning gear 33, would be simply spinning the gears 48 and similar gears free-wheelingly on their countershaft. The construction in accordance with FIG. 7 is simpler than that of FIG. 6, involves less moving parts and provides a somewhat stronger connection than the transmission through housing 35 and disk 38 as in the embodiment of FIG. 6.

The operation of the selector valving arrangement in FIG. 4 remains the same with the embodiments of FIG. 6 or 7.

It will be appreciated that various oil seals and packings would be employed at various locations in the transmission illustrated on the drawings. These were purposely eliminated in the interest of clarity of illustration.

Modifications may be resorted to without departing from the spirit and scope of the present invention.

I claim:

1. In a transmission construction, the combination comprising:
   an input shaft,
   an output shaft aligned adjacently rearwardly of said input shaft,
   a drive gear secured to said input shaft for rotation therewith,
   a transfer gear mounted for free rotation coaxially on said input shaft and located rearwardly of said drive gear,
   a first countershaft assembly, said assembly including:
      a first countershaft rotatably mounted in spaced parallel relationship with said input shaft,
      a fore gear secured to said countershaft in enmeshing relationship with said drive gear on said input shaft,
      a rear gear rotatably and coaxially carried by said countershaft in enmeshing relationship with transfer gear on said input shaft,
      a selectively actuable clutch carried by said rear gear adapted for effecting releasable engagement of said rear gear and said first countershaft, and
   a selectively actuable clutch means carried coaxially by said transfer gear and adapted for releasable engagement with said output shaft.

said last-mentioned clutch includes an integral annular

2. The transmission as claimed in claim 1, wherein said last-mentioned clutch includes an integral annular shell carried rearwardly of said transfer gear, said shell enveloping said output shaft, friction means providing releasable engagement between said input shaft aft end and said shell and a disk means splined to the fore end of said output shaft and to said shell.

3. The transmission as claimed in claim 2, wherein said clutches are fluid actuable.

4. The transmission as claimed in claim 2, wherein said transmission includes means for selectively actuating said clutches.

5. The transmission as claimed in claim 2, which includes a second countershaft assembly as claimed in claim 1 and, in addition, an idler gear between the transfer gear and the fore gear of said second countershaft assembly whereby, when actuated, the output shaft rotates in the opposite direction of said input shaft.

6. The transmission as claimed in claim 2, wherein said disk is shiftable axially on said output shaft and said transmission includes fluid pressure actuation means for urging said disk forward to actuate said friction means and spring means for urging said disk rearwardly deactuating said friction means.

7. In a transmission construction, the combination comprising:
   an input shaft having an aft gear clutch,
   an output shaft in aligned adjacent relationship rearwardly of said input shaft,
   a first transfer gear rotatably carried by said input shaft,
   first clutch means actuable for selective releasable engagement of said first transfer gear and said input shaft,
   a second transfer gear rotatably carried by said input shaft,
   second clutch means carried by said output shaft for selective releasable engagement with the aft gear clutch of said input shaft,
   means connecting said first clutch means and second clutch means for effecting alternate actuation of said clutch elements,
   means connecting said second transfer gear to said output shaft and
   a countershaft assembly including:
      a first countershaft rotatably mounted in spaced parallel relationship with said input shaft,
      a fore gear secured to said countershaft in enmeshing relationship with said drive gear on said input shaft,
      a rear gear rotatably and coaxially carried by said countershaft in enmeshing relationship with said transfer gear on said input shaft and
      a selectively actuable clutch carried by said rear gear adapted for effecting releasable engagement of said rear gear and said first countershaft.

8. The transmission as claimed in claim 7, wherein:
   said first transfer gear includes an aft gear clutch facing rearwardly,
   said first clutch means includes:
      an axially shiftable collar splined to said input shaft, said collar having a forward facing gear clutch thereon engageable with said rearwardly facing gear clutch,
   said second clutch means includes an axially shiftable collar member having an annular gear clutch formed facing forwardly for mating engagement with said aft gear clutch of said input shaft and
   said connecting means for connecting said second transfer gear to said output shaft includes an annular disk-like member integral with said last-mentioned collar.

9. The transmission as claimed in claim 8, wherein said construction includes spring means normally urging said collar and disk combination rearwardly, maintaining the aft gear clutch of said input shaft out of engagement with said second clutch means, composed of collar and connected disk, and a fluid pressure actuation means for urging said disk and collar member forwardly to engage said aft gear clutch of said input shaft with said second clutch means while simultaneously disengaging the aft gear clutch of said first transfer gear from the associated gear clutch in said collar, whereby said first transfer gear is freely rotatable on said input shaft.

10. In a transmission construction, the combination comprising:
   an input shaft,
   an output shaft in aligned adjacent relationship rearwardly of said input shaft,
   a first gear coaxially and rotatably carried on said input shaft, said gear including engageable clutch means formed on the aft side thereof,
   a second gear coaxially and integrally carried by said output shaft, said second gear including engageable second clutch means formed on the fore side thereof,
   an axially shiftable annular collar member splined to said input shaft, said collar having clutch means fore and aft, adapted to shift between engagement with said clutch means on said fore gear and with said clutch means on said second gear, and
   a countershaft assembly including:
      (a) a countershaft rotatably mounted in spaced relationship with said input shaft, (b) a fore gear secured to said countershaft in enmeshing relationship with said first gear on said input shaft, (c) an aft gear, rotatably and coaxially carried by said countershaft in enmeshing relationship with said second gear integral with said output shaft and (d) a selectively actuable clutch carried by said aft gear adapted for effecting releasable engagement of said aft gear and said countershaft.

11. A transmission construction as claimed in claim 10 which includes actuable fluid pressure actuation means for urging said collar member in one direction into engagement with one of said clutch means and spring means for urging said collar member in the opposite direction into engagement with the other of said clutch means.

12. A transmission construction as claimed in claim 11 wherein said spring means normally urges said collar member forwardly for engagement with said clutch means on said first gear whereby said output shaft rotates as determined by the gear train established by said countershaft assembly and wherein said fluid pressure actuation means, when actuated, urges said collar member rearwardly into engagement with said second clutch means on said second gear whereby said output shaft rotates directly with said input shaft.

13. A transmission as claimed in claim 11 wherein said fluid pressure actuation means include an annular piston slidably carried on said output shaft, a bell housing enclosure having one end wall slidably receiving said output shaft and a connected skirt enveloping said piston to define a fluid tight chamber, and said transmission construction includes conduit means for impressing actuating fluid pressure to said chamber, groove means formed on the periphery of said collar member, a plurality of support rods mounted on said second gear and projecting forwardly parallel with said input shaft and terminating proximate said groove means, a plurality of pivot arms pivotably pinned to said support arms, with one end of the pivot arms riding in said groove means, and a plurality of connecting rods connecting said piston and pivot arm ends opposite the ends riding in said groove means.

14. In a fluid valving system for alternately connecting fluid line pressure to any one of a plurality of fluid pressure actuated clutch mechanisms, said system including first conduit means carrying line pressure, and second conduit means leading to said clutches, the improvement which includes:

a plurality of valves each including a first port connected to said first conduit means, a second port connected to said second conduit means and a third port connecting with appropriate conduit leading to a reservoir, said valves each including an interior plug means movable between a first position operative to connect the first and second port and a second position operative to connect said second and third port, and a movable selector member mounted proximate said valves, said member including means operative to effect movement of said plug means individually from said second position to said first position and vice versa responsive to movement of said selector member.

15. The fluid valving system as claimed in claim 14 which includes means operative to move said selector member.

16. The fluid valving system as claimed in claim 16 wherein said means for effecting movement of said selector member is vacuum.

17. The fluid valving system as claimed in claim 16 which includes a spring means opposing said vacuum means.

18. The fluid valve system as claimed in claim 14 wherein said valves comprise a plurality of side-by-side cylindrical tubes each having a cylindrical plug therein adapted for axial movement between first and second positions and said selector member includes a linear arm movable across the side-by-side ends of said tubes, said arm including a recess adapted to receive the ends of said plugs in sequence when situated thereover thereby moving said plug to said second position.

19. The fluid valve system as claimed in claim 18, which further includes means for selectively connecting each of said tubes collectively to a vacuum whereby said cylindrical plugs in each of said cylindrical tubes are urged into the first position.

20. The fluid valving system as claimed in claim 18 which includes a vacuum actuable element connected to said linear arms, said element being adapted to move said arm responsive to increased vacuum and a spring means normally urging said arm reversely to that induced by said vacuum.

21. In a transmission construction, the combination comprising:
an input shaft,
an output shaft aligned adjacently rearwardly of said input shaft,
a drive gear secured to said input shaft for rotation therewith,
a transfer gear mounted for free rotation coaxially on said input shaft and located rearwardly of said drive gear,
a first countershaft assembly, said assembly including:
a first countershaft rotatably mounted in spaced parallel relationship with said input shaft,
a fore gear secured to said countershaft in enmeshing relationship with said drive gear on said input shaft,
a rear gear rotatably and coaxially carried by said countershaft in enmeshing relationship with said transfer gear on said input shaft,
a selectively actuable, fluid actuated clutch carried by said rear gear adapted for effecting releasable engagement of said rear gear and said first countershaft,
a selectively actuable, fluid actuated clutch means carried coaxially by said transfer gear and adapted for releasable engagement with said output shaft, and
a valving system as claimed in claim 15 for connecting the actuating fluid to said clutches selectively.

References Cited

UNITED STATES PATENTS

| | | | |
|---|---|---|---|
| 992,967 | 5/1911 | Lever | 74—359 |
| 2,209,010 | 6/1940 | Wallis | 74—331 |
| 2,397,587 | 4/1946 | Armantrout | 74—359 |
| 2,931,238 | 4/1960 | Kiechle | 74—364 |
| 2,998,732 | 9/1961 | Nelson | 74—364 |

ARTHUR T. McKEON, *Primary Examiner.*

U.S. Cl. X.R.

74—331, 359; 192—109, 87.19